G. F. DISCHER.
BUMPER BRACKET.
APPLICATION FILED MAR. 20, 1920.
1,342,374.  
Patented June 1, 1920.
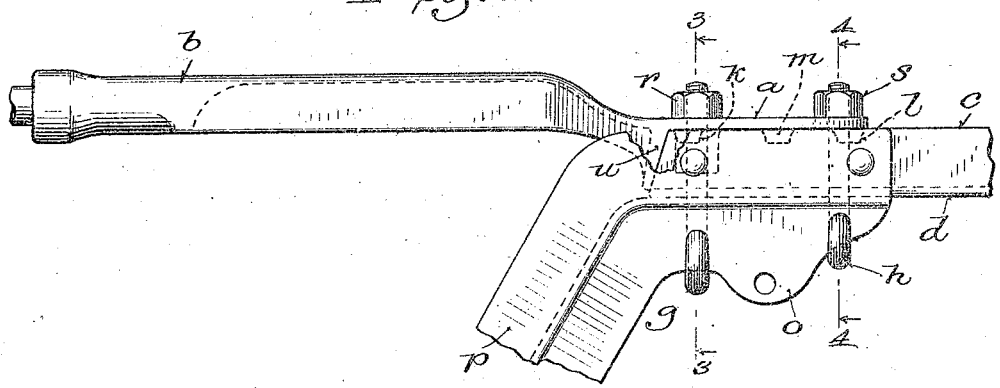
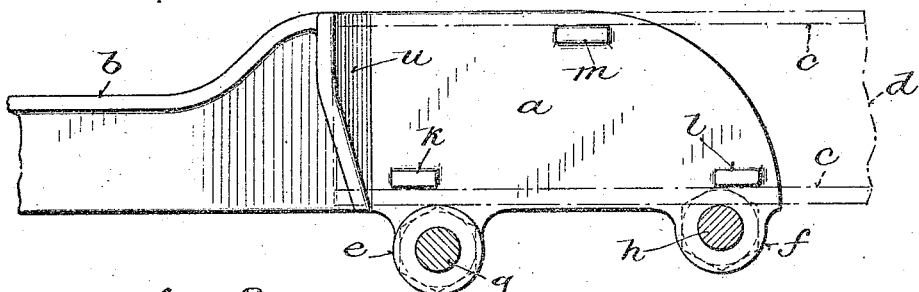
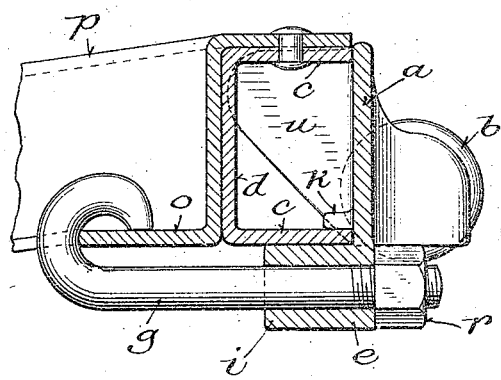
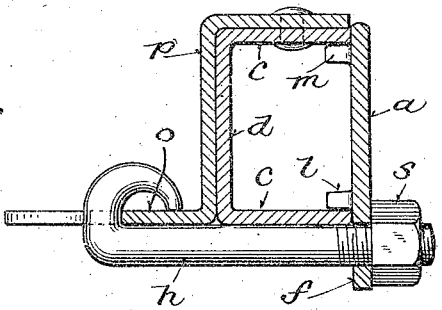
Inventor:  
Grant F. Discher,  
By Bottum Bottum Hudnall & Lecher  
Attorneys.

UNITED STATES PATENT OFFICE.

GRANT F. DISCHER, OF MILWAUKEE, WISCONSIN.

BUMPER-BRACKET.

1,342,374.   Specification of Letters Patent.   Patented June 1, 1920.

Application filed March 20, 1920. Serial No. 367,406.

*To all whom it may concern:*

Be it known that I, GRANT F. DISCHER, a citizen of the United States, residing at Milwaukee, in the county of Milwaukee and State of Wisconsin, have invented certain new and useful Improvements in Bumper-Brackets, of which the following is a specification, reference being had to the accompanying drawing, forming a part thereof.

This invention relates more particularly to means for mounting bumpers on automobiles of the Overland type having outwardly projecting longitudinal frame flanges.

The main objects of the invention are to facilitate the application of bumpers to automobiles of this type; to accurately position and securely hold the bumpers and bumper supporting and fastening members in place; to relieve the clamping bolts and nuts from excessive stresses and strains resulting from shocks or collisions of the bumpers with obstructions or from the tightening of the nuts on the bolts; and generally to improve the construction of devices of this class.

It consists in the construction, arrangement and combination of parts as hereinafter particularly described and pointed out in the claims.

In the accompanying drawing like characters designate the same parts in the several figures.

Figure 1 is a plan view of a bumper bracket embodying the invention as applied to the front end of an Overland automobile frame, for which it is specially designed; Fig. 2 is an enlarged elevation of the inner side of a portion of the bracket, the hook clamping bolts being shown in cross section; Fig. 3 is an enlarged cross section on the line 3—3, Fig. 1; and Fig. 4 is a similar section on the line 4—4, Fig. 1.

While the bracket shown by the drawing is specially designed for the front end of an Overland automobile frame, it is applicable with little or no change, to the rear end of the frame, and to similar frames having outwardly projecting longitudinal flanges.

The bracket comprises an attachment plate $a$, which is formed or provided at one end with a bumper supporting arm $b$, with which the bumper bar is connected in the usual or any suitable manner.

The plate $a$, which is fitted to bear against the outwardly projecting flanges $c$ of a channel side member $d$ of the frame, as shown in Figs. 3 and 4, is formed or provided on the inner side with positioning bearings adapted to engage with opposite sides of the flanges $c$. The special bracket shown in the drawing is formed on the lower edge of the attachment plate $a$, with downwardly projecting ears $e$ and $f$, having holes therein for clamping bolts $g$ and $h$. The ear $e$ is extended inwardly and forms a sleeve or boss $i$, which serves as a support for the shank of the bolt $g$, to hold the bolt in its proper position at right angles to the plate, and as a positioning bearing for engagement with the under side of the lower frame flange $c$, as shown in Fig. 3.

The bolt hole in the ear $f$ is located close to the under side of the lower flange $c$, so that the shank of the bolt $h$ will engage with the flange and serve as a positioning bearing for the plate $a$, as shown in Fig. 4.

The plate $a$ is also formed on its inner side with inwardly projecting lugs or flanges $k$, $l$ and $m$, which are adapted to engage with the frame flanges $c$ and thus serve as positioning bearings for the plate.

As shown in Figs. 2, 3 and 4, the lugs or flanges $k$ and $l$ are arranged above and opposite the holes for the bolts $g$ and $h$, in position to engage with the upper side of the lower flange $c$, while the lug or flange $m$ is located at an intermediate point in position to engage with the under side of the upper flange $c$.

The bracket is provided with hooked clamping bolts $g$ and $h$, adapted to pass through the holes in the ears $e$ and $f$, and to engage with an inwardly projecting frame flange $o$. The outer ends of the bolts are threaded and provided with nuts $r$ and $s$. The flange $o$ is formed on the lower side of an end or cross frame member $p$, which in Overland cars as at present constructed, is riveted or fastened to and connects the channel side members $d$ of the frame at the front end thereof, the frame being provided with a similar cross connecting member at the rear end.

The lugs or flanges $k$, $l$ and $m$ engaging with opposing sides of the outwardly projecting frame flanges $c$, and the lugs or flanges $k$ and $l$, which might obviously be extended and merge in a single flange, engaging the upper side of the lower flange c opposite the boss i and the shank of the bolt h which engage the lower side of said flange, determine the position of the plate a on the frame in applying the bracket thereto, and securely hold it in place when the nuts are moderately tightened on the bolts, thereby obviating the necessity of tightening the nuts to the extent of stripping or injuring the screw threads, and relieving the bolts of excessive shearing stresses and strains resulting from shocks or collisions of the bumper with obstructions.

To further relieve the clamping bolts from stresses and strains resulting from the impact of the bumper with obstructions and end thrust on the arm b, the plate a may be formed as shown, at the end next to the arm, with a thrust abutment u, adapted to engage with the end of the side frame member d.

The number, arrangement and extent of the lugs or flanges on the attachment plate, and the number and arrangement of the clamping bolts for fastening the bracket to the frame, may be varied to adapt the bracket to varying conditions and to variations in the construction of the frame, without material change in the mode of application and operation of the bracket, and without departure from the principle of the invention. As for example, a single clamping bolt like either of the bolts g and h, or two or more bolts with or without supporting bosses i, may be employed with each attachment plate a. In practice, two bolts like the bolts g, with bosses i therefor, are used at the rear end of an Overland frame, for fastening each bracket thereto.

With a frame and brackets of the design shown and described, drilling holes in or otherwise cutting or marring the frame or other parts of an automobile for the attachment of a bumper, is avoided.

I claim:

1. In a bumper bracket for automobiles having longitudinally flanged frame members, the combination of an attachment plate fitted to bear against the side of a frame member, and provided with positioning bearings adapted to engage with opposite faces of the frame member against which said plate is seated, and a bolt having a nut threaded thereon for clamping said plate to the frame member with the positioning bearings in engagement with opposite faces thereof.

2. In a bumper bracket for automobiles having an outwardly flanged frame member, the combination of an attachment plate provided with inwardly projecting positioning bearings adapted to engage with opposite faces of an outwardly projecting frame flange against which the plate is seated, and a bolt having a nut threaded thereon for clamping said plate to the frame member.

3. In a bumper bracket for automobiles having an outwardly flanged frame member, the combination of an attachment plate provided with inwardly projecting positioning bearings adapted to engage with opposite faces of outwardly projecting frame flanges against which the plate is seated, and a clamping bolt having a nut threaded thereon for clamping said plate to the frame member.

4. In a bumper bracket for automobiles having an outwardly flanged frame member, the combination of an attachment plate formed with bolt holes and provided with inwardly projecting positioning bearings adapted to engage with opposite faces of an outwardly projecting frame flange against which the plate is seated, and clamping bolts provided with nuts and adapted to pass through the holes in said plate and to engage a part of the frame.

5. In a bumper bracket for automobiles having inwardly and outwardly projecting longitudinal frame flanges, the combination of an attachment plate formed with a bolt hole and provided with inwardly projecting positioning bearings adapted to engage with opposite flange faces of the frame member against which the plate is seated, a hook bolt adapted to pass through the hole in the plate and to engage with an inwardly projecting frame flange, and a nut threaded on the outer end of the bolt.

6. In a bumper bracket for automobiles having outwardly projecting longitudinal frame flanges, the combination of an attachment plate provided at one end with a bumper supporting arm and having inwardly projecting positioning bearings adapted to engage with opposite flange faces of the frame member against which the plate is seated, and a bolt having a nut threaded thereon for clamping the plate to said frame member.

7. In a bumper bracket for automobiles having inwardly and outwardly projecting longitudinal frame flanges, the combination of an attachment plate provided at one end with a bumper supporting arm and formed with a bolt hole and at a distance therefrom with inwardly projecting opposing positioning bearings adapted to engage with opposite faces of an outwardly projecting frame flange against which the plate is seated, a hook bolt adapted to pass through the hole in the plate and engage with an inwardly projecting frame flange, and a nut threaded on the outer end of the bolt.

8. In a bumper bracket for automobiles having inwardly and outwardly projecting longitudinal frame flanges, the combination of an attachment plate having a bumper supporting arm at one end and formed with a bolt hole and at a distance therefrom with inwardly projecting positioning bearings adapted to engage with opposite faces of outwardly projecting frame flanges against which the plate is seated, a hook bolt adapted to pass through the hole in the plate and to engage with an inwardly projecting frame flange, and a nut threaded on the outer end of the bolt.

9. In a bumper bracket for automobiles having inwardly and outwardly projecting longitudinal frame flanges, the combination of an attachment plate provided at one end with a bumper supporting arm and formed with bolt holes and with inwardly projecting positioning bearings adapted to engage with opposite faces of an outwardly projecting frame flange against which the plate is seated, hook bolts adapted to pass through the holes in the plate and engage with an inwardly projecting frame flange, and nuts threaded on the outer ends of the bolts.

10. In a bumper bracket for automobiles having inwardly and outwardly projecting longitudinal frame flanges, the combination of an attachment plate provided at one end with a bumper supporting arm and formed with bolt holes and with inwardly projecting positioning bearings adapted to engage with opposite faces of outwardly projecting frame flanges against which the plate is seated, hook bolts adapted to pass through the holes in the plate and engage with an inwardly projecting frame flange, and nuts threaded on the outer ends of the bolts.

11. In a bumper bracket for automobiles having outwardly projecting longitudinal frame flanges, the combination of an attachment plate formed with inwardly projecting positioning bearings adapted to engage with opposite faces of the frame flange against which the plate is seated, one of said bearings extending around a bolt hole and forming a support for a bolt passing therethrough, clamping bolts adapted to pass through the holes in the plate and to engage with a part of the frame, the hole for one of the bolts being positioned so that the shank of the bolt passing through it will bear against the adjacent side of the frame flange, and nuts threaded on the outer ends of the bolts.

12. In a bumper bracket for automobiles having outwardly projecting longitudinal frame flanges, the combination of an attachment plate formed with bolt holes and with inwardly projecting positioning bearings adapted to engage with opposite faces of the frame flanges against which the plate is seated, one of said bearings forming a bolt supporting boss around one of the holes and the hole for the other bolt being positioned so that the shank of the bolt will bear against the adjacent side of one of the flanges, clamping bolts adapted to pass through the holes in the plate and to engage with a part of the frame, and nuts threaded on the outer ends of the bolts.

13. In a bumper bracket for automobiles having outwardly projecting longitudinal frame flanges, the combination of an attachment plate formed with positioning bearings adapted to engage with opposite flange faces of the frame member against which the plate is seated, said plate being also formed with an inwardly projecting thrust abutment adapted to engage with the end of said frame member, and a bolt having a nut threaded thereon for clamping the plate to said frame member.

14. In a bumper bracket for automobiles having longitudinal frame flanges, the combination of an attachment plate formed with positioning bearings adapted to engage with the inner faces of opposing parallel frame flanges against which the plate is seated, said plate being also formed with a bolt hole and a bolt supporting boss adapted to engage the outer face of one of said flanges, and a clamping bolt adapted to pass through the hole in the plate and to engage a part of the frame.

In witness whereof I hereto affix my signature.

GRANT F. DISCHER.